United States Patent
Tsuruta et al.

(10) Patent No.: US 11,460,010 B1
(45) Date of Patent: Oct. 4, 2022

(54) SMC INTEGRATED BI-STABLE STRIPS FOR REMOTE ACTUATION

(71) Applicant: Toyota Motor Engineering & Manufacturing North America, Inc., Plano, TX (US)

(72) Inventors: Ryohei Tsuruta, Ann Arbor, MI (US); Brian J. Pinkelman, Ann Arbor, MI (US); Umesh N. Gandhi, Farmington Hills, MI (US); Paul A. Gilmore, Ann Arbor, MI (US); Mark E. Smith, Fenton, MI (US); Eric D. Smith, Northville, MI (US); Shardul Singh Panwar, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/216,951

(22) Filed: Mar. 30, 2021

(51) Int. Cl.
    *F03G 7/06* (2006.01)
(52) U.S. Cl.
    CPC .................................. *F03G 7/065* (2013.01)
(58) Field of Classification Search
    CPC ........................................ F03G 7/065
    USPC ................................... 60/526–528
    See application file for complete search history.

(56) References Cited

U.S. PATENT DOCUMENTS

| | | | |
|---|---|---|---|
| 1,658,669 A * | 2/1928 | Cohn | H01H 71/16 310/306 |
| 4,544,988 A | 10/1985 | Hochstein | |
| 6,422,010 B1 * | 7/2002 | Julien | F01D 25/005 60/527 |
| 6,943,653 B2 | 9/2005 | Hanke et al. | |
| 9,171,686 B2 | 10/2015 | Alacqua et al. | |
| 9,784,249 B2 | 10/2017 | Li et al. | |
| 10,061,350 B2 | 8/2018 | Magi | |
| 2005/0210874 A1 * | 9/2005 | Browne | F03G 7/065 60/527 |
| 2006/0201149 A1 * | 9/2006 | Biggs | H01H 1/0036 60/527 |

(Continued)

OTHER PUBLICATIONS

Unknown Author, "Slap bracelets" (https://en.wikipedia.org/wiki/Slap_bracelet) last downloaded on Mar. 29, 2021, 2 pages.

(Continued)

*Primary Examiner* — Shafiq Mian
(74) *Attorney, Agent, or Firm* — Christopher G. Darrow; Darrow Mustafa PC (57) ABSTRACT

A remote actuator includes one or more bi-stable strips with at least one shape memory composite (SMC) spring connected to each bi-stable strip. The SMC spring includes a thermoplastic and an electrical and/or thermal conductor for transforming the length of the SMC spring upon heating. The contraction of the SMC spring transforms the bi-stable strip from its coiled stable state to its elongated stable state. The displacement of the SMC spring can be amplified by a simple machine included in the remote actuator. The remote actuator can include a shape memory alloy (SMA) strip for transforming the bi-stable strip from its elongated stable state to it curved stable state upon heating. Heating can be by Joule heating or from an adjacent heat source.

18 Claims, 4 Drawing Sheets

(56) References Cited

U.S. PATENT DOCUMENTS

2009/0241537 A1* 10/2009 Browne .............. B60J 1/2011
　　　　　　　　　　　　　　　　　　　　　　60/527
2013/0227943 A1* 9/2013 Mance ................ F03G 7/065
　　　　　　　　　　　　　　　　　　　　　　427/256
2015/0185764 A1* 7/2015 Magi .................. G06F 1/163
　　　　　　　　　　　　　　　　　　　　　　361/679.03
2019/0154122 A1　5/2019 Lima et al.

OTHER PUBLICATIONS

Jitosho, R. et al., "Exploiting Bistability for High Force Density Reflexive Gripping," IEEE Conference (2019) 7 pages.

Haines, C. et al., "New Twist on Artificial Muscles," PNAS vol. 113, No. 42 (Oct. 18, 2016) pp. 11709-11716.

Inoue, H. et al., "High-performance structure of a coil-shaped soft-actuator consisting of polymer threads and carbon nanotube yarns," AIP Advances 8 (2018) 8 pages.

Abbas, A. et al., "A Physics Based Model for Twisted and Coiled Actuator," IEEE International Conference on Robotics and Automation (ICRA) (2017) pp. 6121-6126.

Haines, C. et al., "Artificial Muscles from Fishing Line and Sewing Thread," (Supplementary Materials) Science 343, 868 (2014) pp. 1-36.

Yip, M. et al., "On the Control and Properties of Supercoiled Polymer Artificial Muscles," IEEE Transactions on Robotics (2016) 11 pages.

\* cited by examiner

SMC INTEGRATED BI-STABLE STRIPS FOR REMOTE ACTUATION

TECHNICAL FIELD

The present disclosure generally relates to a remote actuator for switching a device between two states.

BACKGROUND

Bi-stable strips mechanisms use deflection to store and release energy between two distinct stable states of the strip, generally a straight and a curved shape. The two states retain their passive shapes without actuation, and generally resist a change in shape by small momentum transfer upon contact with an object. Bi-stable strips are useful where switching from one shape to the other shape is actuated by a force only to change shape. These mechanism have been used for many "low-tech" applications, such as ornamental "slap-bracelets" to "high tech" applications such as micro-grippers in binary robotic devices that require ready compliance as well as bi-stability in a cost-effective manner.

A typical bi-stable strip is a spring steel defined by a long axis with a positive curvature perpendicular to the long axis, curving the short axis, to form a shape that can be described as a portion of a height of a cylinder that includes less than 180 degrees of the circumference. This quasi-flat elongate state with a perpendicular curvature to the long axis constitutes a first stable state. The second stable state of the bi-stable strip is where the strip curves perpendicular to the short axis wrapping the long axis at least partially along the diameter of a short cylinder having the height of the short axis. The bi-stable strip can be formed by plastic deformation and bending during a heat treatment of a metal strip to the first stable state. As both the first and second states are stable, force is only required for transformation between these states and not for the maintenance of the shapes.

Bi-stable strips can be coupled to a shape memory alloys (SMAs) for actuation. SMAs are a group of metallic alloys that can be changed in shape or size but can return to an original shape or size when actuated. This transformation phenomenon is known as the shape memory effect (SME). The SMA transforms from a martensitic (M) phase to austenitic (A) phase on heating and A→M on cooling in a reversible manner with thermal energy converting into mechanical work. Hence, an SMA deformed under an external force recovers its original shape by heating to or beyond a designed transition temperature based on the specific composition employed. An SMA typically contracts by less than 10 percent, yet actuating device that contract by more than about ten percent is desirable. To this end a remote actuator with a large deflection upon heating is presented herein.

SUMMARY

This section provides a general summary of the disclosure and is not a comprehensive disclosure of its full scope or all its components.

In various aspects, the present teachings provide a remote actuator including a bi-stable strip that can be actuated into its elongated state from a curved state by heating a shape memory composite (SMC) spring connected at both ends of the bi-stable strip and situated within the curvature of the bi-stable strip along the long axis when the bi-stable strip is in its elongated state. The bi-stable strip can be converted from its elongated state into its coiled state by placing a force on the curvature parallel to the long axis of the bi-stable strip. This force can be one that occurs when an object to be secured by the coiling (closing) of the bi-stable strip is pressed against the bi-stable strip in its quasi-flat state or pressed by hand. This mode of transformation may not be practical for some uses of the remote actuator and the bi-stable strip actuator may include a shape memory alloy (SMA) strip fixed perpendicularly to the long axis of the bi-stable strip, where heating of the SMA strip applies a force to close the bi-stable strip into a curved state where the axis of the curved bi-stable strip is perpendicular to the length of the bi-stable strip. The SMA strip can be heated to a temperature where the SMA transforms to its austenitic (A) phase by the application of a controlled electrical current across the SMA.

The SMC can be a thermoplastic that is combined with a thermally conductive component to transfer heat to the thermoplastic and/or the conductive component. A heat source can be an electrically conductive component for Joule heating of the coiled thermoplastic filament for contracting the heated coiled filament. The composite is in the broadest definition of a composite, where the electrically conductive component can be a filler in a polymer matrix, a coating on the plastic filament, or one or more metallic wire co-coiled with one or more plastic filaments. The remote actuations can be carried out by selectively passing a current for Joule heating of the SMC spring and, where present, alternatively passing current for heating of the SMA strip to promote the transformation of the bi-stable strip from one stable state to the other. In non-limiting examples, the actuator can be triggered by a switch that can be powered by pushing a button or toggle switch electrically connected to the remote actuator, or by providing a switching command from an interface device that is remote to the bi-stable strip and SMC spring.

In another aspect, the present disclosure provides a method of remotely activating a device that is transformed from one stable state into another stable state of a bi-stable strip. The functioning state of the device can be where the bi-stable strip is in its curved state to provide a closed or holding orientation, but where the functioning state is accessed from the bi-stable strip's elongated state, which is the device's open or released state. The device can undergo a transformation into is functioning closed state by placing a force on the curved portion of the bi-stable strip in a manual fashion in its open elongated state. The force can be generated by heating an SMA strip included in the remote actuator to rapidly transform the bi-stable strip into its curved state when a transformation temperature is reached. The actuating to the curved state can occur by the placement of a force on the elongated bi-stable strip by pressing an article to be secured or a device or to otherwise place the bi-stable strip in a functioning form by the coiling of the bi-stable strip to its curved stable state without heating of an SMA strip. The secured article can be released, or the device can be placed in an elongated form by the activation of the SMC spring. Activation of the SMC spring can be via heat generated by application of an electrical current or by directing heat from a heat source that can direct heat to the SMC spring, such as directed heated air or an adjacent heating pad.

Further, the present disclosure provides a device includes at least one remote actuator that has an SMC spring for transforming a bi-stable strip into an elongated stable state by the contraction of the SMC spring. This device may include an SMA strip to promote the transformation of the elongated state of the bi-stable strip to its curved state. The device can include other components, for example, a simple machine, which can be selected from levers, pulleys, axles, pistons, screws, or other common simple machines that can amplify or otherwise augment the motion actuated by dimensional changes of the SMC spring, or the SMA strip, of the remote actuator. In this manner, the displacement and force provided by the combined bi-stable strip and the SMC spring, and any SMA strip can provide actuation, motion, and force to a simple machine component of the device.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate components from a combination of figures.

DETAILED DESCRIPTION

The present technology provides a remote actuator that can transform between two stable states of a bi-stable strip. The bi-stable strip can be steel or any other metal. The bi-stable strip can be actuated between an elongated stable state and a curved stable state. In one embodiment, the bi-stable strip is attached to at least one shape memory composite (SMC) spring, residing within the curvature perpendicular to the long axis of the bi-stable strip in the elongated stable state.

An SMC has a coiled polymer matrix and can include fillers, coatings, or co-windings to accentuate the coil's ability to contract upon heating and extend upon cooling. The filler can be thermally and electrically conductive materials, such as carbon fibers, carbon nanotubes, or metal fibers or wires. These coils, or springs, can be inexpensive relative to SMAs and can possess a greater deformation by contraction of the coil upon heating than a typical SMA. The SMC is a composite of thermoplastic and a thermal and/or electrical conductor. The use of an electrical conductor allows for Joule heating of the SMC spring. Alternatively, the heating can be by a heating source external to the remote actuator, such as a heating pad or a directed stream of heated air.

The thermoplastic in the SMC spring can be of many different types, for example, but not limited to, nylon 6,6, nylon 6, nylon 12, HDPE, and UHMWPE. The SMC's thermoplastic can be derived from readily available sources, even from common fishing line or sewing thread. The thermoplastic can possess at least some crystalline phase, which can enhance the thermal transformation. The SMC can have a single relatively thick thermoplastic filament of up to about two mm in diameter or can be constructed from one or more small filaments, with a thickness of as little as a few microns, for example, but not limited to 20 microns, can be employed. The size of the remote actuator can vary depending upon the device with which it will be used for actuation of the devices function. The SMC can include a super coiled polymer (SCP), or any thermoplastic used for applications such as artificial muscles. The filament can be coiled by twisting a single filament or many filaments or the one or more filaments can be wound about a rod or mandrel and annealed to retain its shape as the SMC spring. The SMC spring is a composite that is any combination of one or more thermoplastic filaments with a thermally and/or electrically conductive component. The conductive component can be a filler in a thermoplastic matrix, a coating on the plastic filament(s), or one or more conductive wires co-wound or co-coiled with one or more plastic filaments. Fillers can include carbon fibers, carbon nanotubes, graphene flakes, metal fibers, metal flakes, or any combination thereof. Coatings can be painted or electrodeposited films including a conductive component, such as silver, gold, or other metals. Wires can be copper, aluminum, or any other metal wire that is sufficiently deformable to be co-sound or co-coiled with the thermoplastic filament.

Figure 1:
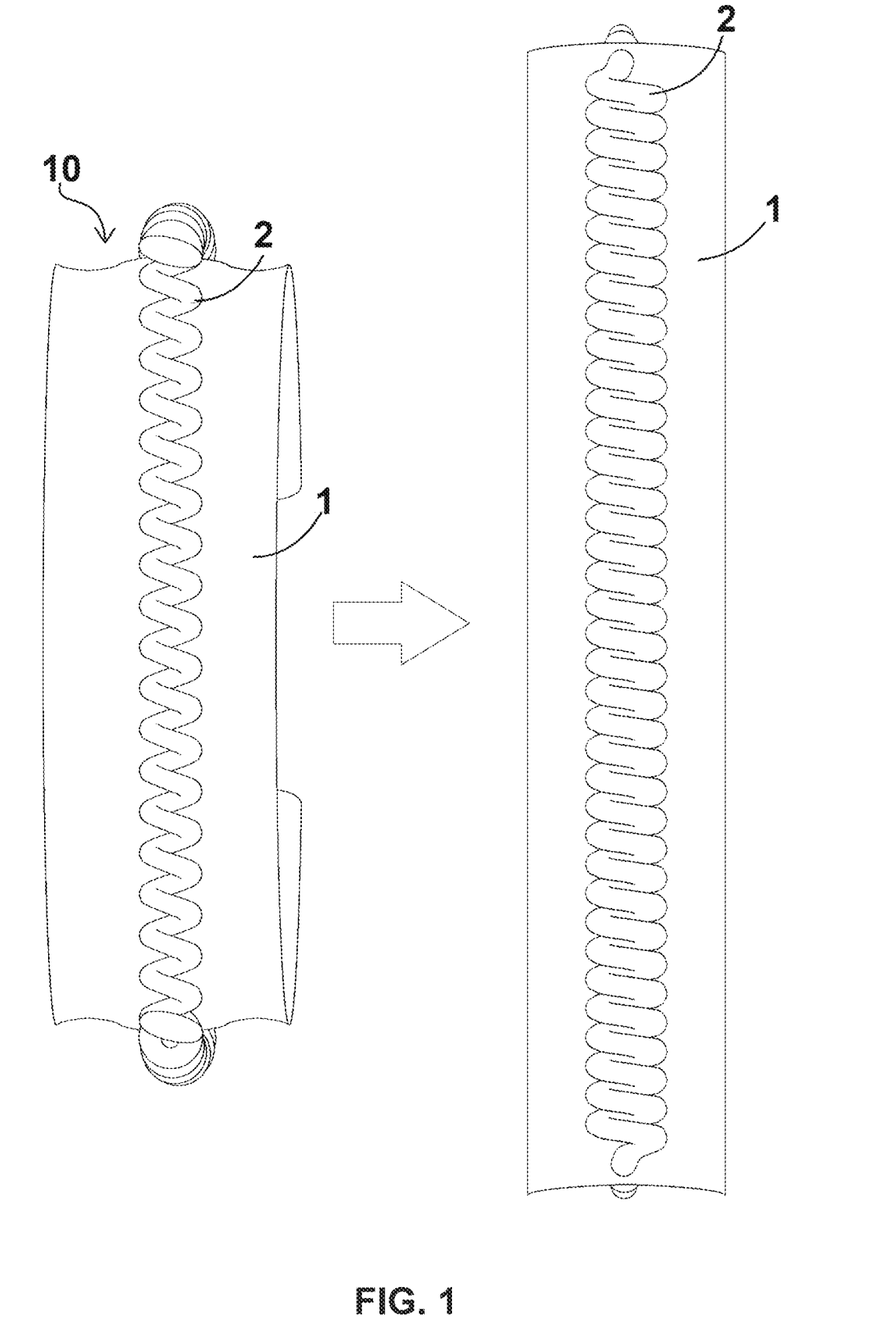
FIG. 1 is a drawing of a remote actuator with a bi-stable strip and a shape memory composite (SMC) spring for manual transformation into a bi-stable strip's curved stable state and remote actuation to its elongated stable state.

The filaments, or the filament and conductor in the form of a wire or filament of combined conductive fibers, are twisted or coiled about a mandrel to form the SMC spring. For example, a nylon 6,6 fishing line that is coated with a silver paint can be wound about a mandrel and annealed to form an SMC spring 2. In one embodiment, the SMC spring is fixed at the two ends of a bi-stable strip 1, as illustrated in FIG. 1, to form remote actuator 10 where the SMC spring 2 resides along the long axis of the elongated bi-stable strip. The heating of the SMC spring contracts the SMC spring, which places sufficient force on the curved bi-stable strip 1 to transform the stable curved state to the elongated stable state. The change in length of the SMC spring 2 depends upon its composition and geometry, where length changes of as little as about two percent to about fifty percent or more are possible by selection of the geometry of the SMC spring. The coils of an SMC spring can be one formed by a tight twist of one or more filaments; a uniform coil generated by winding around a mandrel; or a coil of varying coil diameters along the length such that contraction can be very large, where an ensemble of different sized coils can reside in approximately a single plane perpendicular to the length of the extended SMC spring. Although the SMC spring 2 is shown to be reside compactly along the entire length of the bi-stable strip 1 in FIG. 1, this is not necessary and the length of the SMC spring in its elongated shape can be greater than that of the bi-stable strip, where the SMC spring does not parallel the bi-stable strip over its entire length. Yet, when heated, it contracts to a length such that it applies a stress at its points of attachment to generate sufficient force to evoke the transformation from the curved stable state to the elongated stable state of the bi-stable strip. Though not shown in FIG. 1, the SMC spring can be connected to an electrical wire to provide a current that causes the heating and the contraction of the spring. The transformation upon heating is rapid where sufficient contraction, and not necessarily maximum contraction, of the SMC spring promotes the straightening of the bi-stable strip. Once that force for transformation has been achieved, the current and heating can be turned off. The heating can be for a period that is very short, for example, about 0.5 to about 2 seconds, by applying a current to the conductor of the SMC spring. The heating time required depends upon the size of the SMC spring, how it is partitioned, and what proportion of the composite is the heating component. The electrical switching to an off position to end heating can be carried out by coupling a switch to the movement of the bi-stable strip such that heating ends immediately after the transformation has occurred. The elongated bi-stable strip 1 is shown in FIG. 1 with the fully contracted SMC spring 2 while hot. Upon removal of the heat, the cooling SMC spring 2 returns to its initial length and can bend out of plane when fixed to the bi-stable strip. One or both ends of the SMC spring can further extend through holes for connection to the ends of the bi-stable strip 1 where a knot, knob, or other form of a stop is present to prevent regression of the end through the hole with lose of the attachment needed for placing the force on the bi-stable strip when contracting of the SMC spring. The bi-stable strip 1 may be physically attached to the SMC spring 2 in any fashion by any means, including bolts, adhesives, hooks, or pins.

The remote actuator 10 of FIG. 1 actuates remotely in the one direction for the opening of the coiled state to the elongated state. A manual force upon the curvature of the bi-stable strip in the elongated state can promote the transformation to the curved state. This remote actuator can be useful for devices that secure an object by the curving of the bi-stable strip about the object. A plurality of actuators can be used in conjunction with each other. For example, two or more parallel bi-stable strips can be actuated simultaneously or sequentially by electrical current to release a long object secured at both ends, such as a cane or umbrella holder for a vehicle. The object can be placed in the device including the remote actuator by pressing the object against the longitudinal curvature of the bi-stable strip in its elongated stable state, which then secures that object within the curved state of the bi-stable strip(s).

Figure 2:
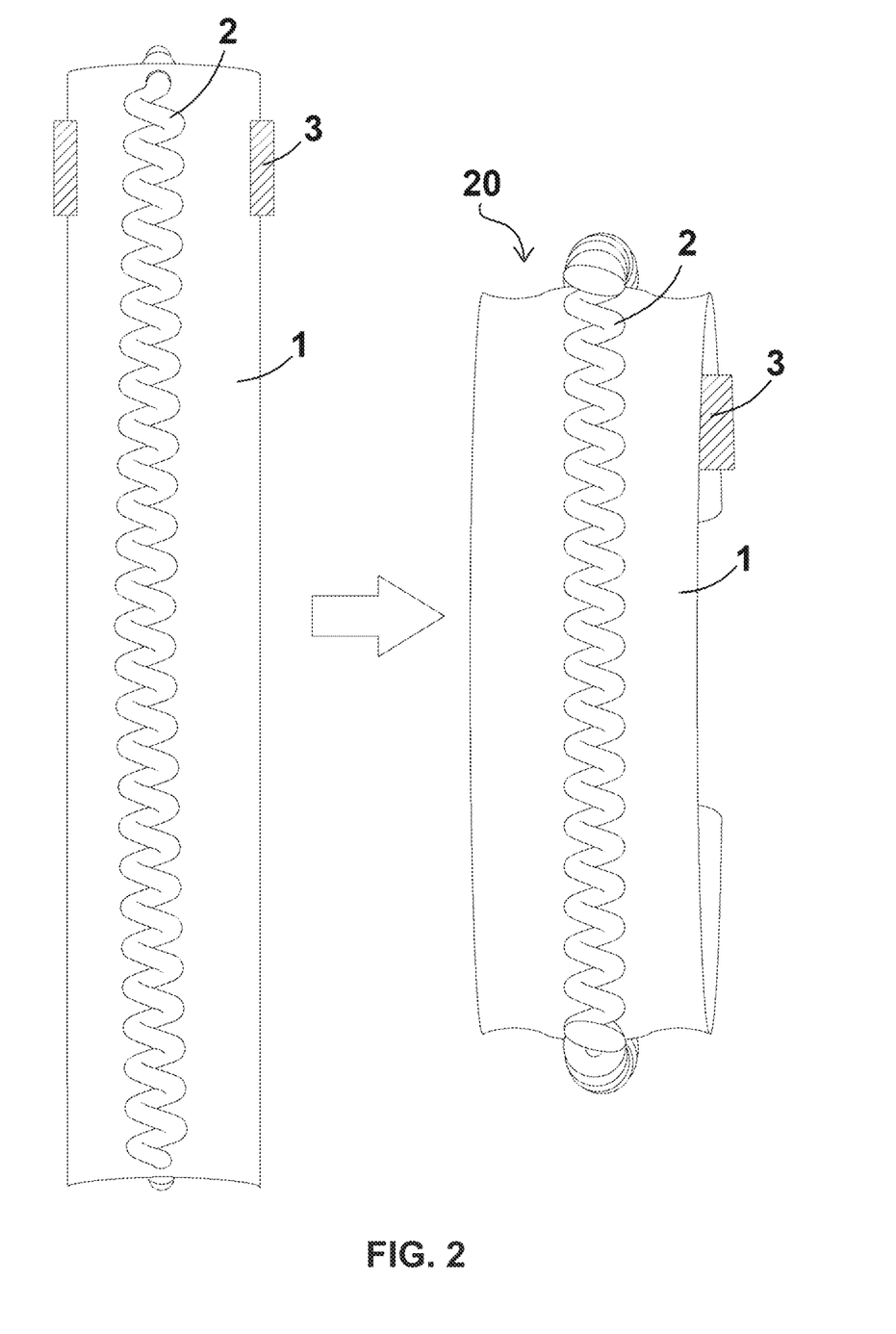
FIG. 2 is a drawing of a remote actuator with a bi-stable strip, an SMC spring, and a shape memory alloy (SMA) strip for remote actuation to a curved stable state and remote actuation to an elongated stable state.

In an embodiment, the remote actuator can include one or more shape memory alloy (SMA) strips 3 attached to the bi-stable strip 1 for applying a force on the longitudinal curvature of the bi-stable strip 1 for a transformation from the elongated state to the curved state, as shown in FIG. 2. The SMA strip 3 transforms from a curved band to a flat band upon heating to provide the force for the transformation. The heating can be a Joule heating by passing electrical current through the SMA strip 3. The SMA strip can be a nitinol (a nickel/titanium alloy) or any other shape memory alloy that returns to its memory shape upon heating with the imposing of a force on the bi-stable strip that causes its transformation to the curved stable state from the elongated stable state that had been achieved by a previous contraction of an SMC spring 2. This remote actuator 20 allows remote actuation from either stable state to the other stable state. This remote actuator is well suited for constructing devices that require the extension or contraction of the bi-stable strip but do not function in the immediate vicinity of the individual that chooses to command for actuation. In a vehicle, the remote actuator can be used to: extend and retract a visor; open or close a vent; prepare organizers; generate a holder; or can be included into any other device that is advantageously reversibly transformed using one or more remote actuators. The remote actuator 20 is relatively light in mass and able to be positioned such that it does not protrude into the functioning space. The remote actuator can even be hidden in a very small volume compartment or rested on any surface, for example on a flat surface when the remote actuator resides in its elongated stable state or on a curved surface when the remote actuator resides in its curved stable state.

Figure 3:
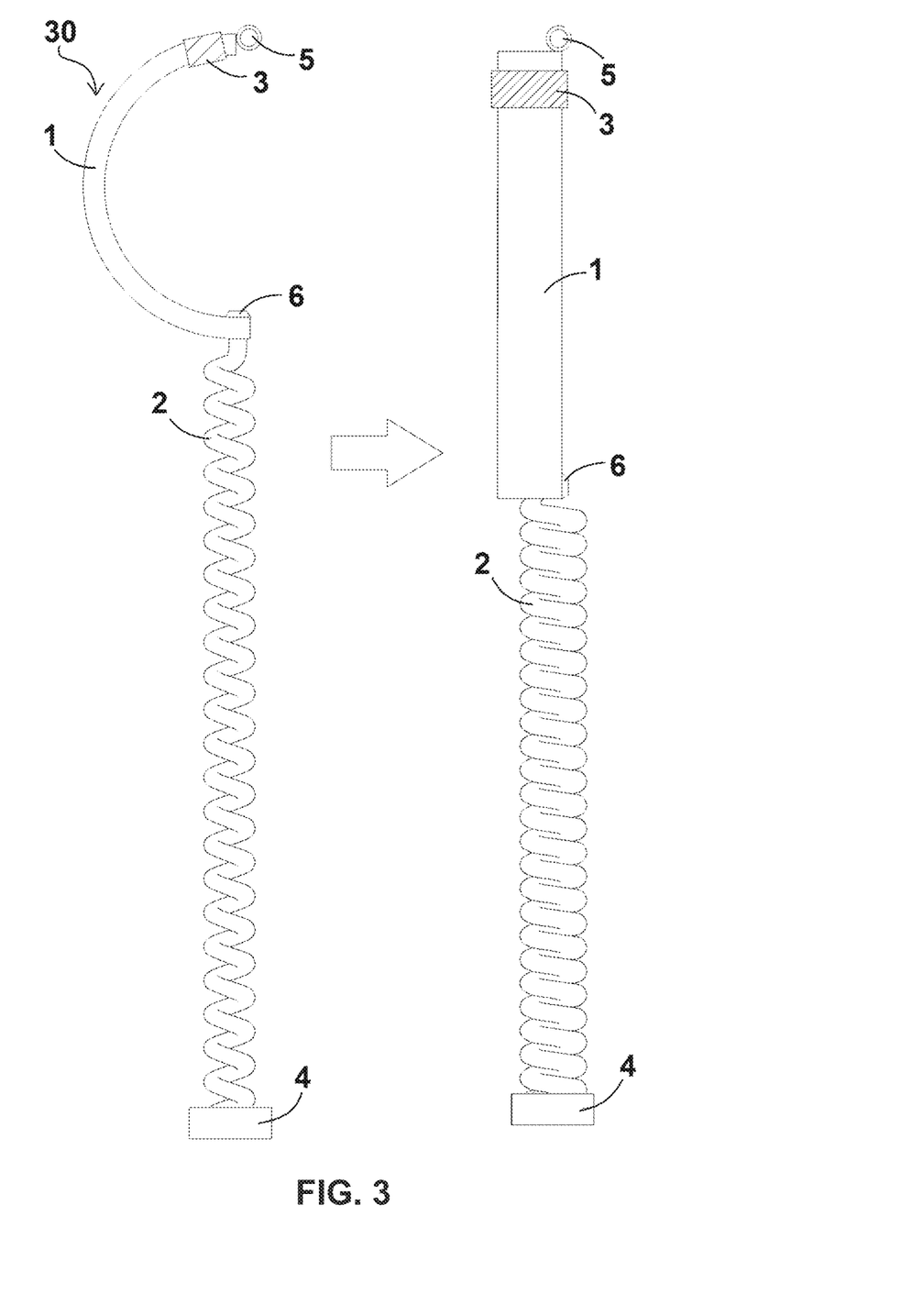
FIG. 3 is a drawing of a remote actuator with a bi-stable strip, an SMC spring, and an SMA strip for remote actuation to a curved stable state and remote actuation to an elongated stable state where the SMC spring is attached to only one position on the bi-stable strip.

The SMC spring can be attached to only one site of the bi-stable strip, for example at one end of the bi-stable strip and attached to another site on a device or within an environment in which the remote actuator is employed. As shown in FIG. 3, an SMC spring 2 is attached to one end of the bi-stable strip 1 at one end and, as shown, anchored to a site 4 in the environment for which it is to function. With this remote actuator 30, one end of the bi-stable strip 1 can be attached to another site 5 in its environment, where upon heating the SMC spring, the transformation to the elongated stable state of the bi-stable strip is initiated. As shown in FIG. 3, a half cylinder curved stable state bi-stable strip 1 is attached to an SMC spring 2 that, as shown, contracted by about 22 percent, and the length of the SMC spring 2 is nearly matched to the extension of the bi-stable strip 1 in its elongated stable state. The entire, 157 percent increase in displacement, from the diameter of the curve to the circumference of that curve, by the attaching plug 6 to an opposite end attachment site 5 is accommodated with the 22 percent contraction of the SMC spring with this remote actuator. Depending upon the geometry and composition of the SMC spring, this 22 percent contraction can be greater or lesser, for example from about five percent to fifty percent. Although SMC springs can be designed with much greater contraction, more than 50 percent, are possible, the displacement of the bi-stable strip is not limited directly by the degree to which the SMC spring can retract, the remote actuator can be constructed to amplify any available contraction of the SMC spring.

Figure 4:
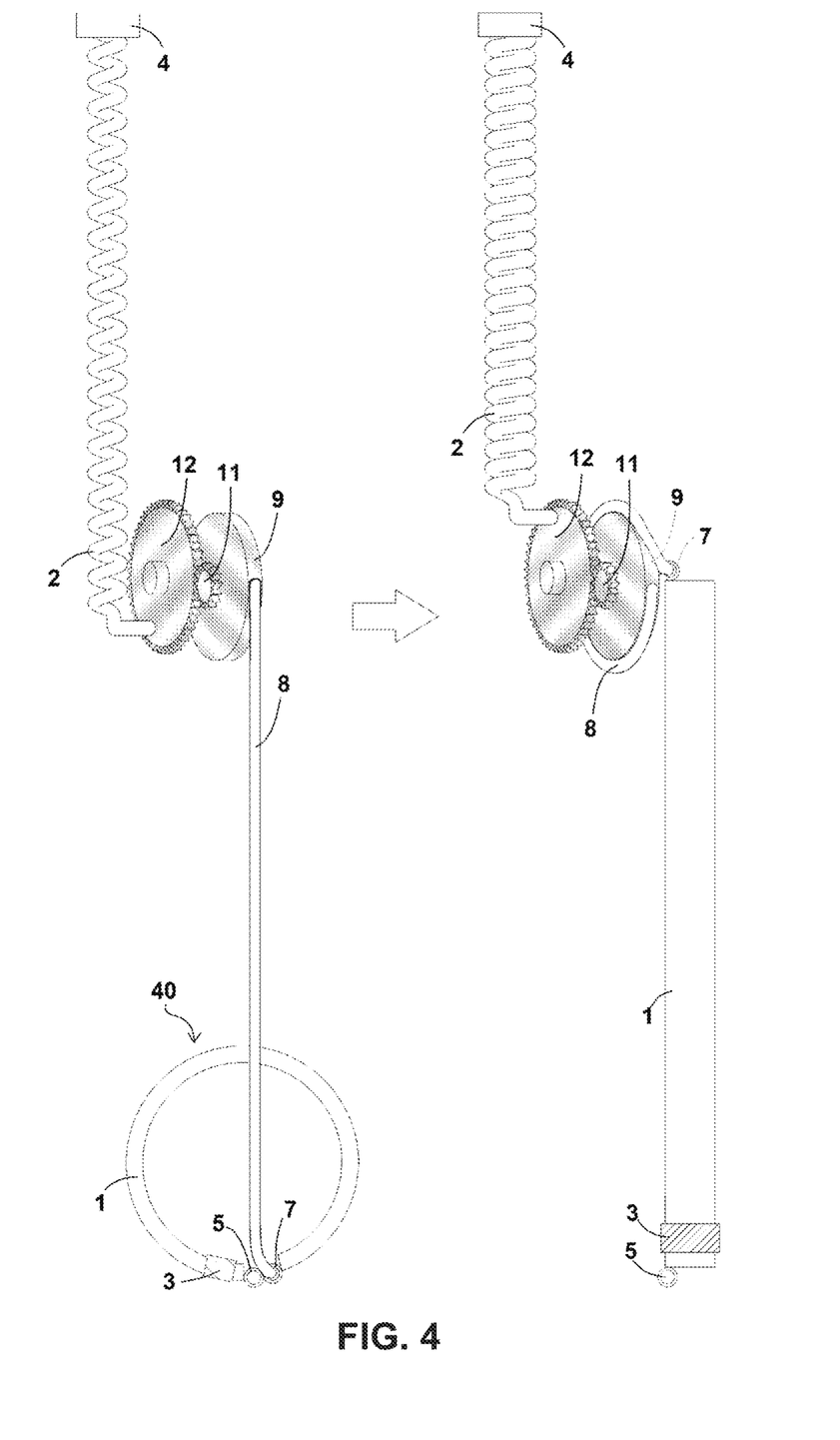
FIG. 4 is a drawing of a remote actuator with a bi-stable strip, an SMC spring, and an SMA strip for remote actuation to a curved stable state and an elongated stable state where the SMC spring is functionally attached to the bi-stable strip through a gear and axle system to amplify the displacement achieved by the SMC spring.

As shown in FIG. 4, a simple machine can be included for amplifying the displacement possible by the SMC spring. Attachment of the SMC spring to the bi-stable strip is a functional attachment and is not necessarily a direct physical attachment between the SMC spring and bi-stable stip. In FIG. 4, a simple machine is shown as part of remote actuator 40. The simple machine extends the breath of possibilities of the remote actuator for implementation in devices. In the non-limiting example shown in FIG. 4, the bi-stable strip 1 has a rotatable attachment 7 for a wire, rope, or cord 8 that wraps about a dowel 9 connected to a small gear 11 on a first axle connected to a large gear 12 on a second axle that drives the small gear 11 when the SMC spring 2 is heated and contracts. In this and other manners, the simple machine is used to amplify the displacement capabilities of the SMC spring 2. This or other simple machines can be employed functionally with an SMA strip. As shown in FIG. 4, the functional attachment of the SMC spring 2 to the bi-stable strip 1 is clearly not a direct attachment, yet the force upon contracting the SMC spring promotes the transformation from the curved state to the elongated state with an amplification of the smaller SMC contraction to match the bi-stable strip elongation on transformation to the elongated stable state. The attachment of the SMC spring 2 near the lower edge of the large gear 12, as shown in FIG. 4, can be inverted, with the attachment at the top of the large gear 12 and the anchoring site 4 residing on the base to which the bi-stable strip attachment site 5 is fixed.

Though not illustrated, those skilled in the art can easily envision how the system can be augmented with screws, levers, pulleys, or any other simple machine to amplify the actuation without the addition of any other components requiring an additional power input to that provided to the SMC spring or SMA strip. Again, the remote actuators can be of various sizes, yet can be of relatively low mass, and require little volume in the bi-stable strips elongated state or the curved state, and the use of simple machines need not add significantly to the volume or mass required of the remote actuator.

The foregoing description is provided for purposes of illustration and description and is in no way intended to limit the disclosure, its application, or uses. It is not intended to be exhaustive or to limit the disclosure. Individual elements or components of a particular embodiment are generally not limited to that embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure and are not intended to limit the disclosure of the technology or any aspect thereof. The recitation of multiple embodiments having stated components is not intended to exclude other embodiments having additional components, or other embodiments incorporating different combinations of the stated components.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or components does not exclude other embodiments of the present technology that do not contain those elements or components.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A remote actuator comprising:
   at least one bi-stable strip with two passive shapes;
   at least one shape memory composite (SMC) spring attached to both ends of each of the at least one bi-stable strip; and
   a heat source configured for heating the SMC spring.

2. The remote actuator according to claim 1, wherein the SMC spring comprises at least one twisted or coiled filament comprising a thermoplastic and a conductor, where the conductor is an electrical conductor and/or a thermal conductor.

3. The remote actuator according to claim 2, wherein the thermoplastic comprises nylon 6,6, nylon 6, nylon 12, or ultra-high-molecular-weight polyethylene (UHMWPE).

4. The remote actuator according to claim 3, wherein the conductor comprises a filler within a matrix comprising the thermoplastic.

5. The remote actuator according to claim 4, wherein the filler is selected from a multiplicity of carbon nanotubes (CNTs), carbon fibers, graphene flakes, metal fibers, metal flakes, and any combination thereof.

6. The remote actuator according to claim 2, wherein the conductor comprises a metal coating on the twisted or coiled filament.

7. The remote actuator according to claim 2, wherein the conductor comprises a metal wire co-twisted or coiled with the twisted or coiled filament.

8. The remote actuator according to claim 2, wherein the heat source is the electrical conductor for Joule heating.

9. The remote actuator according to claim 1, further comprising a shape memory alloy (SMA) strip.

10. The remote actuator according to claim 9, wherein the SMA strip is a nitinol strip.

11. The remote actuator according to claim 9, wherein a length of the SMA strip is perpendicular to a long axis of the bi-stable strip, and a length the SMC spring is parallel to the long axis of the bi-stable strip.

12. The remote actuator according to claim 1, further comprising at least one simple machine coupled to the SMC spring.

13. The remote actuator according to claim 12, wherein the simple machine comprises at least one axle, dowel, lever, gear, wheel, or screw.

14. A method of remote actuation, comprising:
    providing a remote actuator, comprising;
       at least one bi-stable strip with two passive shapes; and
       at least one shape memory composite (SMC) spring attached to both ends of each of the at least one bi-stable strip, wherein the SMC spring comprises at least one twisted or coiled filament comprising a thermoplastic and a conductor, where the conductor is an electrical conductor and/or a thermal conductor;
    heating the SMC spring to contract the SMC spring; and
    applying a contractive force from the SMC spring on the bi-stable strip in a curved stable state for elongating the bi-stable strip to an elongated stable state.

15. The method according to claim 14, wherein heating comprises switching an electric switch for passing a current through the electrical conductor of the SMC spring.

16. The method according to claim 14, wherein the remote actuator further comprises a shape memory alloy (SMA) strip.

17. The method according to claim 16, further comprising:
    activating the SMA strip by applying a current to the SMA strip to change to a memory shape; and applying a force from the SMA strip to the bi-stable strip for contracting the bi-stable strip to a curved stable state.

18. The method according to claim 14, wherein the remote actuator further comprises a simple machine coupled to the SMC spring, and the method comprises amplifying a displacement of the SMC spring by using the simple machine.

* * * * *